Dec. 5, 1967  S. J. BIELLO ETAL  3,356,103
CHECK VALVE
Filed Oct. 5, 1964
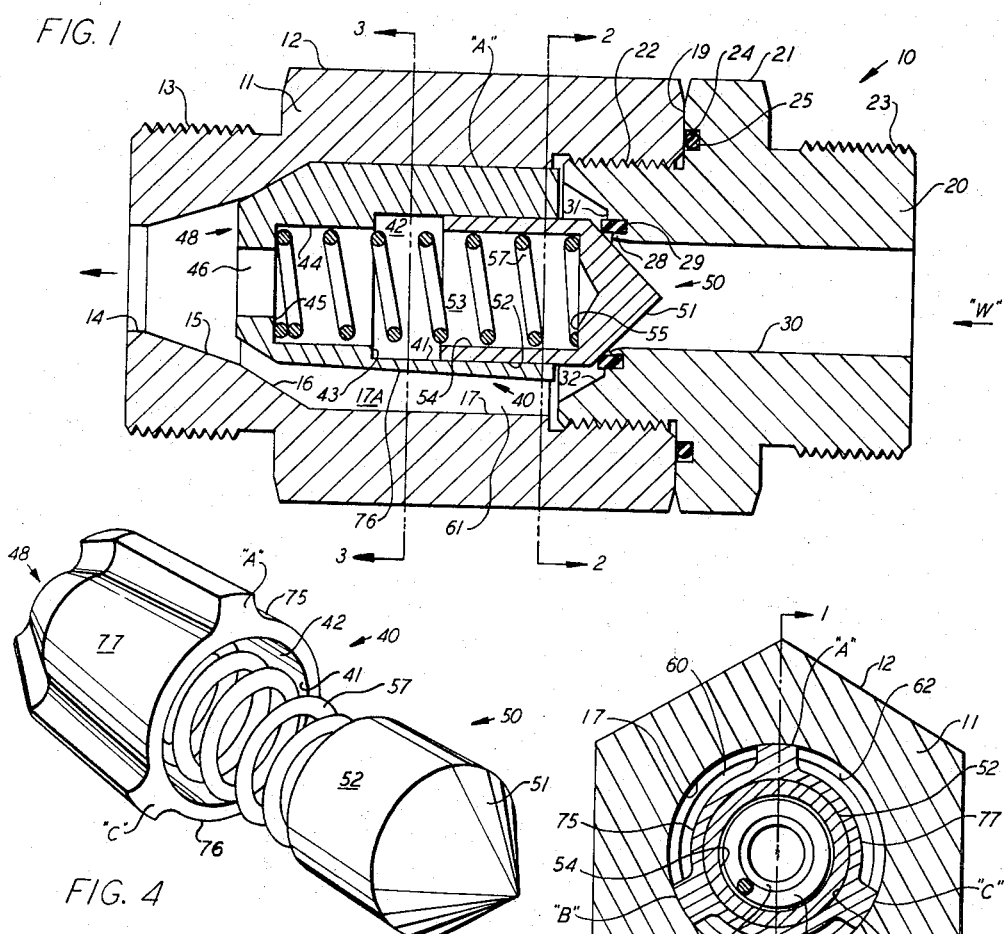
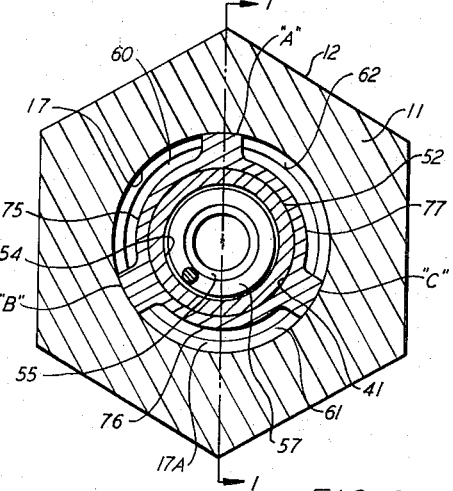
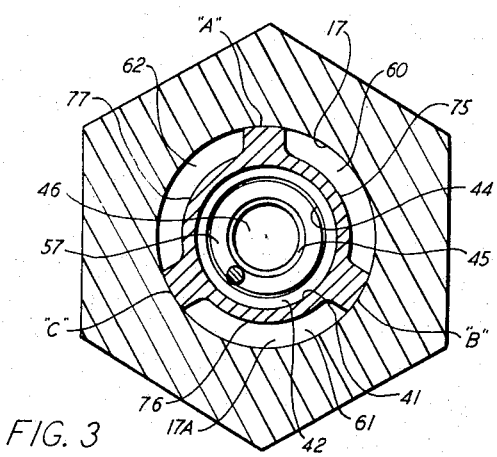
INVENTOR.
STEPHEN JOSEPH BIELLO
CHARLES RUSSELL MARSHALL
BY
*William Frederick Werner*
ATTORNEY

United States Patent Office 3,356,103
Patented Dec. 5, 1967

3,356,103
CHECK VALVE
Stephen Joseph Biello, Somerset, Mass., and Charles Russell Marshall, Warwick, R.I., assignors to Sealol, Inc., Warwick, R.I., a corporation of Delaware
Filed Oct. 5, 1964, Ser. No. 401,624
1 Claim. (Cl. 137—515.5)

ABSTRACT OF THE DISCLOSURE

The present structure prevents a condensate water drop in a gas transmission line from destroying the spring in the check valve. The high pressure gas carrying the water drop bestows the force of the speed of a bullet to the water drip, which becomes a water slug, as the check valve allows the gas to pass through. The water slug upon impact with the coil spring destroys the coil spring.

---

This invention relates to check valves and more particularly to a check valve with a coil spring protected against direct contact with fluid under pressure containing foreign particles in order to insure full operating efficiency at extremely high pressures.

An object of the present invention is to provide a check valve with a structure wherein a water slug in an air line is diverted from directly striking the coil spring as the water slug passes through the check valve.

A check valve placed in a gas transmission line serves the function of allowing the gas to flow in one direction with a pressure flow above a minimum pressure placed upon the poppet valve by a coil spring. It is a common occurrence for water, due to condensation, to be found in a gas transmission line. The gas is usually transmitted at extremely high pressure. At the high transmission pressures, the drops of water carried by the gas, act as bullets or slugs as they strike the coil spring in the check valve. In this manner the coil springs are completely destroyed rendering the check valve useless. It is the purpose of the present invention to overcome this destructive act of a water slug.

Another object of the present invention is to provide a check valve wherein the poppet under the influence of a coil spring remains seated in closed valve position until the fluid acting on the seat of the poppet forces the poppet away from the valve seat into valve open position, thereby directing the flow of fluid through the check valve, in one direction only and without the fluid under pressure directly contacting the spring.

Other objects of the present invention will be pointed out in part and become apparent in part in the following specification and claim.

Referring to the drawings in which similar characters of reference indicate corresponding parts in all the figures:

FIGURE 1 is a longitudinal cross sectional view taken along a line similar to line 1—1 of FIGURE 2 and illustrating the new and improved check valve.

FIGURE 2 is a vertical cross sectional view taken along line 2—2 of FIGURE 1.

FIGURE 3 is a view similar to FIGURE 2 taken on line 3—3 of FIGURE 1.

FIGURE 4 is a perspective view of the coil spring, cage and poppet valve assembly.

Attention is directed to FIGURE 1 wherein is illustrated the new and improved check valve generally indicated by reference character 10. Check valve 10 consists of a main body 11 provided externally with a hexagonal shape 12 or other pipe wrench gripping means and a threaded portion 13, for attachment to a pipe line. Axially, body 11 is provided with a stepped bore consisting of an outlet 14, a tapered area 15, a beveled cage seat 16, a chamber wall 17 and a threaded area 18. Chamber wall 17, beveled cage seat 16, tapered area 15 and outlet 14 constitute a flow passageway 17A.

An auxiliary body 20 is provided externally with an hexagonal shaped shoulder 21 and threaded areas 22 and 23. A circular recess 24 in shoulder 21 is provided with an O ring 25 or other fluid tight packing which bears against end 19 of main body 11. Threaded area 22 rotatively engages threaded area 18. Threaded area 23 is for attachment to a pipe line.

Axially, auxiliary body 20 is provided with an inlet passageway 30, a shoulder 31 and a tapered face 32. The juncture of inlet passageway 30 and shoulder 31 provides a circular valve seat 28. An auxiliary valve seat 29 in the form of a circular washer is inserted in body 20 at shoulder 31 adjacent to circular valve seat 28.

A cage, generally indicated by reference numeral 40, consists of a hollow body having three projecting bearing surfaces A, B and C and three reduced areas 75, 76 and 77. One end of cage 40, generally indicated at 48, is provided with a taper which mates with beveled cage seat 16. It will be noted that the three projecting bearing surfaces A, B, C and the three reduced areas 75, 76, 77 are tapered by means of the same angle as that employed to provide beveled cage seat 16.

Axially cage 40 is provided with a poppet valve sleeve 41, a shoulder 43, a circular area 44, a spring seat 45 and a port 46. Poppet valve sleeve 41 and circular area 44 combine to form a spring retaining chamber 42.

A poppet valve, generally indicated by reference numeral 50, is fabricated out of a solid piece of metal to provide a beveled or pointed poppet valve face 51 and a bearing surface 52. Poppet valve 50 is provided with an axial bore 53 defined by a circular wall 54 and an end wall 55.

A coil spring 57 having a preselected tension is located in spring retaining chamber 42 with one end of spring 57 engaging spring seat 45. Poppet valve 50 is slidably mounted in spring retaining chamber 42 with bearing surface 52 slidably engaging poppet valve seat 41 and with coil spring 57 located on one end in axial bore 53 with the last convolutions of spring 57 engaging end wall 55. Shoulder 43 provides a poppet valve stop to limit the extent that poppet valve 50 may be slid into spring retaining chamber 42.

With auxiliary body 20 detached from main body 11, cage 40 is positioned in flow passageway 17A with the three projecting bearing surfaces A, B and C engaging chamber wall 17 with a "press fit" so as to hold cage 40 in position with end 48 mating with beveled cage seat 16. In this manner said three projecting bearing surfaces provide a three point contact on chamber wall 17 with reduced areas 75, 76 and 77 dividing single flow passageway 17A into three flow areas 60, 61, 62 which are aqual in area to the area of inlet passageway 30. The area of inlet passageway 30 is also known as the "valve size." The three flow areas 60, 61, 62 are equal to the valve size, thereby providing a uniform area of fluid flow through the check valve 10 in open position.

Auxiliary body 20 provided with circular valve seat 28 and auxiliary valve seat 29 is rotatively attached to main body 11 through threaded areas 18 and 22. In this manner pointed poppet valve face 51 seats upon auxiliary valve seat 29 and valve seat 28 with the force of the torque in coil spring 57.

Fluid flowing in the direction of arrow W into inlet passageway 30 will act upon pointed poppet valve face 51. When the force of the fluid is less than the force exerted by coil spring 57 poppet valve face 51 remains seated against circular valve seat 28 and when check valve 10 is provided with auxiliary valve seat 29, pointed poppet valve face 51 will also seat against it.

When the force of the fluid within inlet passageway 30 exceeds the force exerted by coil spring 57, the fluid will act upon poppet valve face 51 to move it in the direction of arrow W away from circular valve seat 28 and auxiliary valve seat 29 to place poppet valve 50 in open position.

The fluid will strike pointed poppet valve face 51 where the fluid will be diverted around face 51 and diffused into flow passageway 17A as directed by the three flow areas 75, 76 and 77. The fluid will then flow through outlet 14.

It will be noted that coil spring 57 is protected from the direct force of the fluid by means of poppet valve 50 and cage 40. The flow of fluid at high speed past beveled cage seat 16 and tapered area 15 will create a suction in chamber 42 through port 46. When the flow of the fluid diminishes fluid may flow through port 46 into spring retaining chamber 42. No harm can then come to coil spring 57 because it is the force of foreign particles striking the convolutions at great force or speed which damages the coils or convolutions of spring 57.

Having shown and described a preferred embodiment of the present invention, by way of example, it should be realized that structural changes could be made and other examples given without departing from either the spirit or scope of this invention.

What we claim is:

A check valve consisting of a main body provided axially with a stepped bore providing a flow passageway and having an outlet, a tapered area, a beveled cage seat, a chamber wall and a threaded area, an auxiliary body provided with an external shoulder and axially with an inlet passageway, a shoulder, and a tapered face, a circular valve seat at the juncture of said inlet passageway and said shoulder, an auxiliary valve seat, means fastening said auxiliary valve seat in said shoulder means fastening said auxiliary body with said main body, a fluid seal between said external shoulder and said main body, a cage provided with three projecting bearing surfaces, three reduced areas between said three projecting bearing surfaces, one end of said cage having a tapered end, said three projecting bearing surfaces providing means to fasten said cage to said chamber wall whereby said three reduced areas convert said flow passageway into three flow passageways in communication with said inlet passageway, and said tapered end engages said beveled cage seat, said cage having axially a poppet valve sleeve, a shoulder providing a stop for said poppet valve, a circular area, a spring seat and a port, a poppet valve having externally a conically pointed poppet valve face and a bearing surface, an axially, a bore defined by a circular wall and an end wall, said bearing surface slidingly engaging said poppet valve sleeve, a coil spring located in said spring retainer chamber and in said bore with one end of said coil spring engaging said spring seat and the other end engaging said end wall, said coil spring resiliently urging said conically pointed poppet valve against, said circular valve seat and said auxiliary valve seat to removably block the communication between said three flow passageways and said inlet passageway with said pointed poppet valve axially aligned with said inlet passageway.

References Cited

UNITED STATES PATENTS

| 746,402 | 12/1903 | Sutton | 137—515.7 |
| 14,424 | 1/1918 | Scoville | 137—516.29 |
| 2,339,101 | 1/1944 | Parker | 251—146 |
| 2,602,631 | 6/1952 | Eickmeyer | 137—515.5 |
| 2,994,340 | 8/1961 | Biello | 137—516.29 |

WILLIAM F. O'DEA, *Primary Examiner.*

W. H. WRIGHT, *Assistant Examiner.*